United States Patent
Jin et al.

(10) Patent No.: US 9,514,512 B2
(45) Date of Patent: Dec. 6, 2016

(54) METHOD AND APPARATUS FOR LAYING OUT IMAGE USING IMAGE RECOGNITION

(71) Applicant: Samsung Electronics Co., Ltd., Suwon-si, Gyeonggi-do (KR)

(72) Inventors: Hyung-Joo Jin, Seoul (KR); Jae-Myoung Lee, Seoul (KR); Chul-Ho Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 14/132,727

(22) Filed: Dec. 18, 2013

(65) Prior Publication Data
US 2014/0192081 A1     Jul. 10, 2014

(30) Foreign Application Priority Data
Jan. 7, 2013     (KR) .................. 10-2013-0001564

(51) Int. Cl.
*G06T 3/00* (2006.01)
*G06K 9/80* (2006.01)
*H04N 5/232* (2006.01)
*G06K 9/00* (2006.01)

(52) U.S. Cl.
CPC ......... *G06T 3/0012* (2013.01); *G06K 9/00469* (2013.01); *G06K 9/80* (2013.01); *G06T 3/0006* (2013.01); *H04N 5/23219* (2013.01)

(58) Field of Classification Search
CPC ... G06T 3/0006; G06T 3/0012; G06T 2210/22
See application file for complete search history.

(56) References Cited

U.S. PATENT DOCUMENTS

| | | | |
|---|---|---|---|
| 2002/0031262 A1 | 3/2002 | Imagawa et al. | |
| 2005/0219393 A1 | 10/2005 | Sugimoto | |
| 2006/0064716 A1 | 3/2006 | Sull et al. | |
| 2007/0054679 A1 | 3/2007 | Cho et al. | |
| 2007/0065044 A1* | 3/2007 | Park .................. | G06F 17/30247 382/305 |
| 2008/0304745 A1 | 12/2008 | Honma | |
| 2008/0313533 A1 | 12/2008 | Hoyer et al. | |
| 2009/0023472 A1 | 1/2009 | Yoo et al. | |
| 2009/0263038 A1* | 10/2009 | Luo .......................... | G06K 9/32 382/254 |
| 2010/0128986 A1 | 5/2010 | Xu | |
| 2010/0156931 A1* | 6/2010 | Boreham ................ | G06T 11/60 345/621 |
| 2010/0199227 A1* | 8/2010 | Xiao ..................... | G06F 3/0481 715/863 |

(Continued)

FOREIGN PATENT DOCUMENTS

| | | |
|---|---|---|
| JP | 2010-102596 A | 5/2010 |
| KR | 10-2010-0018544 A | 2/2010 |

(Continued)

*Primary Examiner* — Jeffery A Brier
(74) *Attorney, Agent, or Firm* — Jefferson IP Law, LLP

(57) ABSTRACT

A method of laying out an image using image recognition is provided. The method includes operations of recognizing, from an original image, a subject part of an original image corresponding to at least a partial area of the original image, cropping the subject part, and displaying the subject part in a predetermined area.

20 Claims, 12 Drawing Sheets

(56) References Cited

U.S. PATENT DOCUMENTS

| | | | |
|---|---|---|---|
| 2010/0266208 A1* | 10/2010 | Downing | H04N 1/3872 382/195 |
| 2011/0014932 A1 | 1/2011 | Estevez | |
| 2011/0058060 A1 | 3/2011 | Bigioi et al. | |
| 2011/0069085 A1* | 3/2011 | Weber | G06T 11/60 345/620 |
| 2011/0126148 A1 | 5/2011 | Krishnaraj et al. | |

FOREIGN PATENT DOCUMENTS

| KR | 10-2011-0033697 A | 3/2011 |
|---|---|---|
| KR | 10-2012-0020006 A | 3/2012 |

* cited by examiner

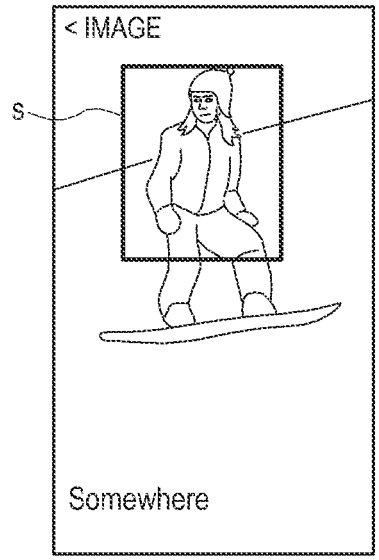 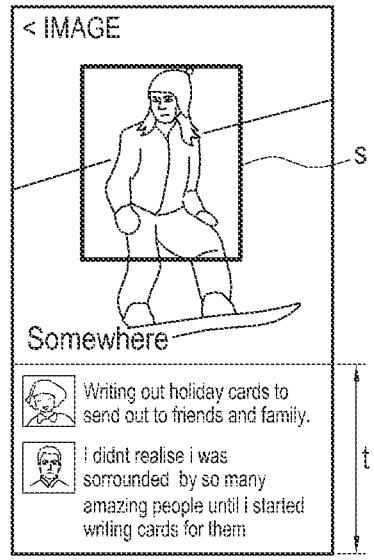
FIG.9A  FIG.9A1
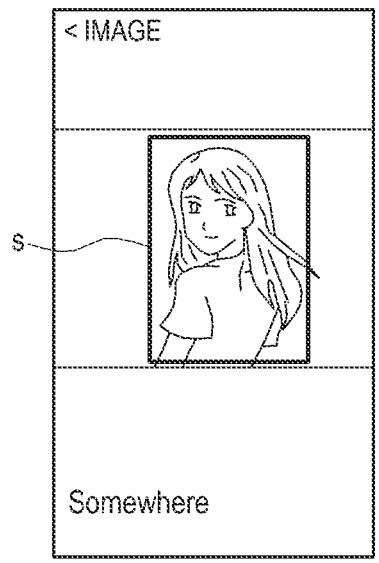 
FIG.9B  FIG.9B1

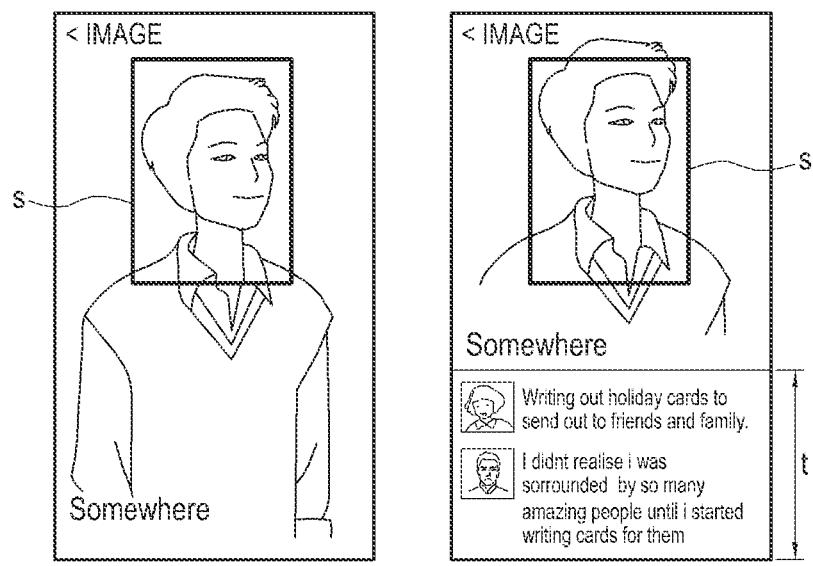

METHOD AND APPARATUS FOR LAYING OUT IMAGE USING IMAGE RECOGNITION

PRIORITY

This application claims the benefit under 35 U.S.C. §119 (a) of a Korean patent application filed on Jan. 7, 2013 in the Korean Intellectual Property Office and assigned Serial No. 10-2013-0001564, the entire disclosure of which is hereby incorporated by reference.

BACKGROUND OF THE INVENTION

1. Field of the Invention

The present invention relates to image layouts. More particularly, the present invention relates to a method and apparatus for laying out an image using image recognition.

2. Description of the Related Art

Recent electronic devices, such as smartphones, tablet PCs, Personal Digital Assistants (PDAs), and Global Positioning Systems (GPSs), provide growing kinds of services and optional functions. In choosing an electronic device, consumers have a tendency to place emphasis not only on the functions of the electronic device but also on visual aspects of the functions.

To keep up with this tendency, technologies have been developed to provide the user with more convenient and well-designed image layouts on the electronic device in which at least one image is arranged within a limited area in an efficient manner.

In this regard, technologies for laying out an image using image recognition are described in Korean Patent Publication No. 10-2009-028038 entitled "METHOD OF USING IMAGE INFORMATION IN PORTABLE TERMINAL" invented by Youngjoon Woo, and Myungjee Kang and assigned to Samsung electronics, which was published on Dec. 15, 2009 and Korean Patent Publication No. 10-2010-0018544 entitled "DYNAMICALLY LAYING OUT IMAGES AND ASSOCIATED TEXT USING PRE-DEFINED LAYOUTS" invented by Crystal Lynn Hoyer and assigned to Microsoft Corporation, which was published on Feb. 17, 2010.

The former discloses a technology for recognizing faces of human beings and displaying the recognized face area, and the latter discloses a technology for displaying images and text using a pre-defined layout.

Additionally, among the currently applied image layout technologies, for, e.g., gallery thumbnails, there is a technology to crop an area centered at an area of the entire image to be in a predetermined size and lay out the resulting image.

Diverse layout technologies have thus been suggested. However, when one of the technologies is applied for laying out an image in a predetermined area, e.g., a smaller area than the image size, unnecessary parts of the image may happen to be placed in the center of a display and thus obscure an important area of the image, thereby producing a poor looking layout. Furthermore, laying out an image and text at separate times may possibly cause a problem in that the important area of the image may be obscured by the text.

Accordingly, there is a need for an apparatus and a method for laying out an image using image recognition to enable an important part of the entire image to be optimally laid out in a predetermined area.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for laying out an image using image recognition to enable an important part of the entire image to be optimally laid out in a predetermined area.

Another aspect of the present invention is to provide a method and apparatus for laying out an image using image recognition to ensure that an important part of the entire image is not obscured by associated text when the image and the text are to be displayed together.

In accordance with an aspect of the present invention, a method of laying out an image using image recognition is provided. The method includes recognizing, from an original image, a subject part that corresponds to at least a partial area of the original image, cropping the subject part of the original image out of the original image, and displaying the cropped subject part in a predetermined area.

In accordance with another aspect of the present invention, a method of laying out an image using image recognition is provided. The method includes recognizing, from an original image, a subject part of the original image based on predetermined criteria in response to a predetermined user command while the original image is displayed in a screen, and determining where to display at least one of the subject part of the original image and text such that the subject part is not obscured by the text, taking into account at least one of a size and a location of the text to be displayed with the original image in the screen.

In accordance with another aspect of the present invention, a method of laying out an image using image recognition is provided. The method includes displaying a list of at least one caller Identification (ID) in a screen when a contact mode is run, displaying an original image for a caller ID in full screen if the caller ID is selected from among the at least one caller ID in the list, recognizing, from the original image, a subject part that corresponds to at least a partial area of the original image displayed in full screen based on a predetermined criterion if a predetermined user command is input, cropping the recognized subject part, and displaying the cropped subject part in a predetermined area in the screen.

In accordance with another aspect of the present invention, an apparatus for laying out an image using image recognition is provided. The apparatus includes a display unit for displaying a running screen of an application program and a menu state, and a controller for controlling layout operations of recognizing a subject part of an original image corresponding to at least a partial area of the original image, cropping the subject part out of the original image, and displaying the cropped subject part in a predetermined area.

The controller may control layout operations of recognizing a subject part of an original image corresponding to at least a partial area of the original image based on a predetermined criteria, upon reception of a predetermined user command while the original image is displayed in a screen, and determining where to display the subject part of the original image and text to be displayed with the original image such that the subject part of the original image is not obscured by the text, taking into account at least one of the size and location of the text.

The controller may control operations of displaying a list in a screen that includes at least one caller ID if a contact mode is run, displaying an original image for a caller ID in full screen when the caller ID is selected from among the at least one caller ID of the list, recognizing a subject part of the original image corresponding to at least a partial area of the original image based on a predetermined criteria, upon reception of a predetermined user command while the original image is displayed in full screen, cropping the subject part, and displaying the subject part in a predetermined area.

According to exemplary embodiments of the present invention, if an image is to be laid out in a predetermined area which is smaller than the image size, an important part of the image may be placed at the center of the display screen with unnecessary parts being out of the center, thus providing a well-designed display screen.

In addition, if associated text is to be displayed with the displayed image, it is ensured that the text does not obscure an important part of the entire image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 9A to 9C1 illustrate screens having images and associated text resulting from operations of laying out images using image recognition according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
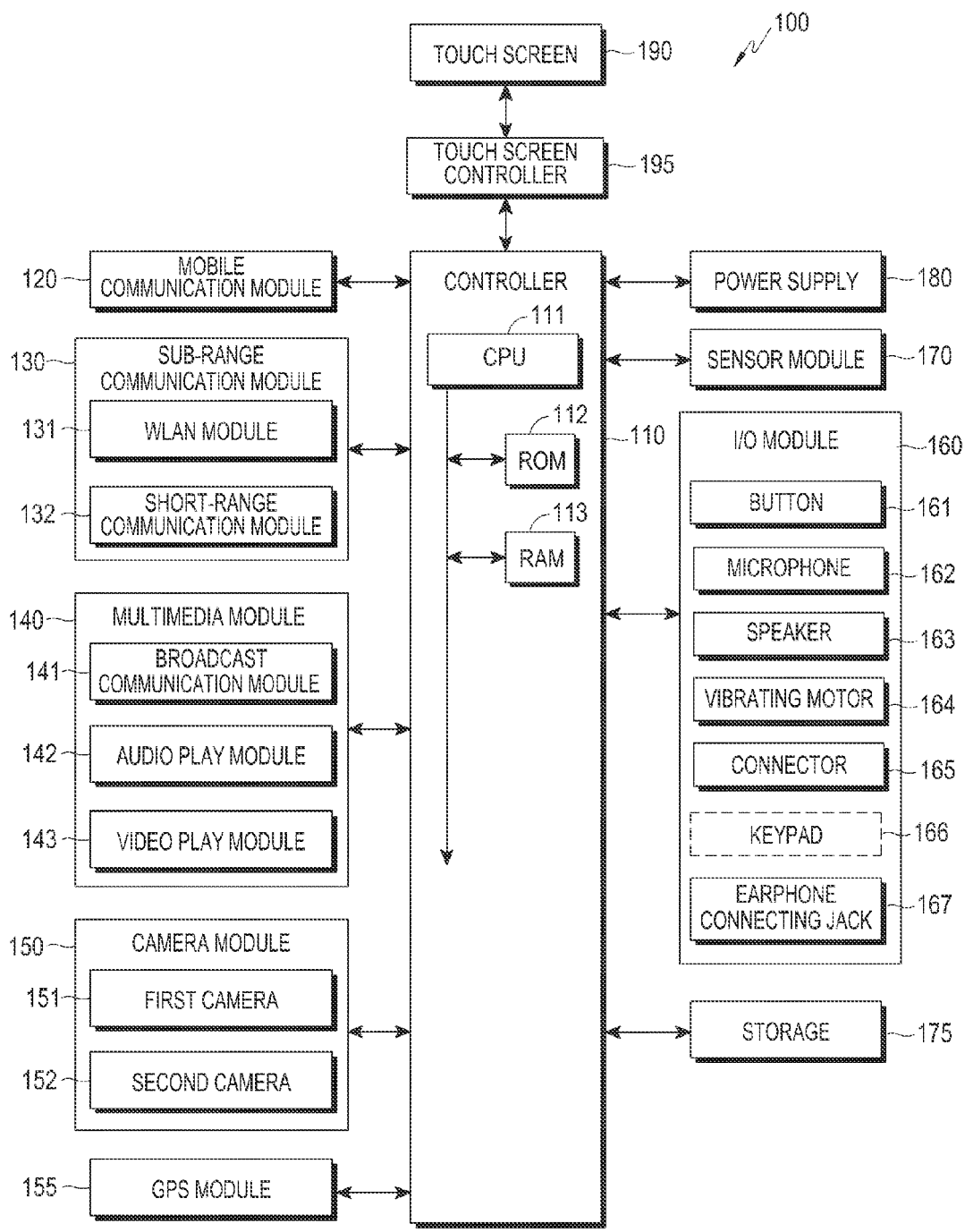
FIG. 1 is a block diagram of a mobile device to which an apparatus for laying out an image using image recognition is applied according to an exemplary embodiment of the present invention.

FIG. 1 is a block diagram of a mobile device to which an apparatus for laying out an image using image recognition is applied according to an exemplary embodiment of the present invention.

Referring to FIG. 1, the mobile device 100 includes a display unit 190 and a display controller 195. The mobile device 100 also includes a controller 110, a mobile communication module 120, a sub-communication module 130, a multimedia module 140, a camera module 150, a Global Positioning System (GPS) module 155, an input/output module 160, a sensor module 170, a storage 175, and a power supply 180. The sub-communication module 130 includes at least one of a Wireless Local Area Network (WLAN) 131 module and a short-range communication module 132, and the multimedia module 140 includes at least one of a broadcast communication module 141, an audio play module 142, and video play module 143. The camera module 150 includes at least one of a first camera 151 and a second camera 152. The input/output module 160 includes at least one of buttons 161, a microphone 162, a speaker 163, a vibration motor 164, a connector 165, and a keypad 166. Hereinafter, the display unit 190 and the display controller 195 are assumed to be e.g., a touch screen and a touch screen controller, respectively.

The mobile communication module 120 connects the mobile device 100 to an external device through mobile communication using at least one or more-antennas (not shown) under control of the controller 110. The mobile communication module 120 transmits/receives wireless signals for voice calls, video conference calls, Short Message Service (SMS) messages, or Multimedia Message Service (MMS) messages to/from a cell phone (not shown), a smart phone (not shown), a tablet Personal Computer (PC) (not shown), or another device (not shown), the phones having phone numbers entered into the mobile device 100.

The sub-communication module 130 may include at least one of the WLAN module 131 and the short-range communication module 132.

The WLAN module 131 may be connected to the Internet in a place where there is a wireless Access Point (AP) (not shown), under control of the controller 110. The WLAN module 131 supports the Institute of Electrical and Electronics Engineers (IEEE) WLAN standard IEEE802.11x. The short range communication module 132 may perform short range communication between the mobile device 100 and another mobile device.

The mobile device 100 may include at least one of the mobile communication module 120, the WLAN module 131 and the short-range communication module 132. For example, the mobile device 100 may include a combination of the mobile communication module 120, the WLAN module 131 and the short-range communication module 132 based on the performance of each module.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown) under control of the controller 110. The audio play module 142 may play digital audio files (e.g., files having extensions, such as mp3, wma, ogg, or way) stored or received under control of the controller 110. The video play module 143 may play digital video files (e.g., files having extensions, such as mpeg, mpg, mp4, avi, move, or mkv) stored or received under control of the controller 110. The video play module 143 may also play digital audio files.

The multimedia module 140 may include the audio play module 142 and the video play module 143 except for the broadcast communication module 141. The audio play module 142 or video play module 143 of the multimedia module 140 may be included in the controller 110.

The camera module 150 may include at least one of the first and second cameras 151 and 152 for capturing still images or video images under control of the controller 110.

The GPS module 155 receives radio signals from a plurality of GPS satellites (not shown) in Earth's orbit, and may calculate the position of the mobile device 100 by using time of arrival from the GPS satellites to the mobile device 100.

The input/output module 160 may include at least one of a plurality of buttons 161, the microphone 162, the speaker 163, the vibrating motor 164, the connector 165, and the keypad 166.

The at least one of buttons 161 may be arranged on the front, side, or back of the housing of the mobile device 100, and may include at least one of power/lock button (not shown), volume button (not shown), menu button, home button, back button, and search button.

The microphone 162 generates electric signals by receiving voice or sound under control of the controller 110.

The speaker 163 may output sounds corresponding to various signals (e.g., radio signals, broadcast signals, digital audio files, digital video files or photography signals) from the mobile communication module 120, sub-communication module 130, multimedia module 140, or camera module 150 to the outside of the mobile device 100 under control of the controller 110. The speaker 163 may output sounds (e.g., button-press sounds or ringback tones) that correspond to functions performed by the mobile device 100. There may be one or multiple speakers 163 arranged in a proper position or proper positions of the housing of the mobile device 100.

The vibrating motor 164 may convert an electric signal to a mechanical vibration under control of the controller 110. For example, the mobile device 100 in a vibrating mode operates the vibrating motor 164 when receiving a voice call from another device (not shown). There may be one or more vibration motors 164 inside the housing of the mobile device 100. The vibration motor 164 may operate in response to a touch activity or continuous touches of a user over the touch screen 190.

The connector 165 may be used as an interface for connecting the mobile device 100 to the external device (not shown) or a power source (not shown). Under control of the controller 110, the mobile device 100 may transmit data stored in the storage 175 of the mobile device 100 to the external device via a cable connected to the connector 165, or receive data from the external device. Furthermore, the mobile device 100 may be powered by the power source via a cable connected to the connector 165 or may charge the battery (not shown) with the power source.

The keypad 166 may receive key inputs from the user to control the mobile device 100. The keypad 166 may include a physical keypad (not shown) formed in the mobile device 100, or a virtual keypad (not shown) displayed on the touch screen 190. The mechanical keypad formed in the mobile device 100 may be excluded depending on the performance or structure of the mobile device 100.

An earphone (not shown) may be inserted into an earphone connecting jack 167 and thus connected to the mobile device 100.

The sensor module 170 includes at least one sensor for detecting a status of the mobile device 100. For example, the sensor module 170 may include a proximity sensor for detecting proximity of a user to the mobile device 10, an illumination sensor (not shown) for detecting an amount of ambient light of the mobile device 100, a motion sensor (not shown) for detecting the motion of the mobile device 100 (e.g., rotation of the mobile device 100, acceleration or vibration applied to the mobile device 100), a geomagnetic sensor (not shown) for detecting a direction using the geomagnetic field, a gravity sensor for detecting a direction of gravity action, and an altimeter for detecting an altitude by measuring atmospheric pressure. At least one sensor may detect the status and generate a corresponding signal to transmit to the controller 110. The sensor of the sensor module 170 may be added or removed depending on the performance of the mobile device 100.

The storage 175 may store signals or data input/output according to operations of the mobile communication module 120, the sub-communication module 130, the multimedia module 140, the camera module 150, the GPS module, the input/output module 160, the sensor module 170, or the touch screen 190 under control of the controller 110. The storage 175 may store the control programs and applications for controlling the mobile device 100 or the controller 110.

The term "storage" implies not only the storage 175, but also a Read Only Memory (ROM) 112 or a Random Access Memory (RAM) 113 in the controller 110, or a memory card (not shown) (e.g., an Secure Digital (SD) card, a memory stick, etc.) installed in the mobile device 100. The storage may also include a non-volatile memory, a volatile memory, a Hard Disc Drive (HDD), a Solid State Drive (SSD), and the like.

The power supply 180 may supply power to one or more batteries (not shown) placed inside the housing of the mobile device 100 under control of the controller 110. The one or more batteries power the mobile device 100. The power supply 180 may supply the mobile device 100 with the power input from the external power source (not shown) via a cable connected to the connector 165. The power supply 180 may also supply the mobile device 100 with wireless power from an external power source using a wireless charging technology.

The touch screen 190 receives the user's manipulations thereon and may display a running screen, an operating status of an application program, a menu state, and the like. In other words, the touch screen 190 may provide the user with a user interface for various services (e.g., call, data transmission, broadcasting, photography services, etc.). The touch screen 190 may send an analog signal corresponding to at least one touch input to the user interface to the touch screen controller 195. The touch screen 190 may receive the at least one touch from user's physical contact (e.g., with fingers including thumb) or via a touchable input device, such as an electronic pen (e.g., a stylus pen). The touch screen 190 may receive consecutive moves of one of the at least one touch. The touch screen 190 may send an analog signal corresponding to the consecutive moves of the input touch to the touch screen controller 195.

Here, the touch is not limited to the user's physical contact or touchable input device and may include non-touches. The detectable distance from the touch screen 190 may vary depending on the performance or structure of the mobile device 100, and in particular, the touch screen 190 may output different values (e.g., current values) for touch detection and hovering detection to distinguishably detect a touch event occurred by a contact with the user's body or the touchable input means and a contactless input (e.g., a hovering event). Furthermore, the touch screen 190 may output different values (e.g., current values) for hovering detection over a distance between where the hovering event occurs and the touch screen 190.

The touch screen 190 may be implemented using resistive, capacitive, infrared, or acoustic wave technology.

The touch screen controller 195 converts the analog signal received from the touch screen 190 to a digital signal (e.g., XY coordinates) and transmits the digital signal to the controller 110. The controller 110 may control the touch screen 190 by using the digital signal received from the touch screen controller 195. For example, in response to the touch event or the hovering event, the controller 110 may enable a shortcut icon (not shown) displayed on the touch screen 190 to be selected or to be executed. The touch screen controller 195 may also be incorporated in the controller 110.

Further, the touch screen controller 195 may determine the distance between where the hovering event occurs and the touch screen 190 by detecting a value (e.g., a current value) output through the touch screen 190, convert the determined distance to a digital signal (e.g., a Z coordinate), and provide the digital signal to the controller 110.

The touch screen 190 may include at least two touch screen panels for detecting touches or proximity thereto by the user's body or the touchable input means to receive both inputs by the user's body or the touchable input means simultaneously. The at least two touch screen panels provide different output values to the touch screen controller 195, and the touch screen controller 195 may differentiate inputs made by the user's body and inputs made by the touchable input means through the touch screen by differently recognizing the values input from the at least two touch screen panels.

The storage 175 may store signals or data input/output according to operations of the mobile communication module 120, the sub-communication module 130, the multimedia module 140, the camera module 150, the GPS module, the input/output module 160, the sensor module 170, and the touch screen 190 under control of the controller 110. The storage 175 may store the control programs and applications for controlling the mobile device 100 or the controller 110.

The controller 110 may include a Central Processing Unit (CPU) 111, the ROM 112 for storing a control program to control the mobile device 100, and the RAM 113 for storing signals or data input from an outside source or for being used as a memory space for working results in the mobile device 100. The CPU 111 may include a single core, dual cores, triple cores, or quad cores. The CPU 111, ROM 112, and RAM 113 may be connected to each other via an internal bus.

The controller 110 may control the mobile communication module 120, the sub-communication module 130, the multimedia module 140, the camera module 150, the GPS module, the input/output module 160, the sensor module 170, the storage 175, the power supply 180, the touch screen 190, and the touch screen controller 195.

In an exemplary embodiment of the present invention, the controller 110 may control layout operations of recognizing a subject part of an original image that corresponds to at least a partial area of the original image, cropping the subject part out of the original image, and displaying the subject part in a predetermined area, based on a property of an apparatus for laying out an image using image recognition.

In another exemplary embodiment of the present invention, the controller 110 may control layout operations of recognizing a subject part of an original image that corresponds to at least a partial area of the original image based on a predetermined criteria, upon reception of a predetermined user command while the original image is displayed in a screen, and determining where to display the subject part of the original image and text to be displayed with the original image such that the subject part of the original image is not obscured by the text, taking into account at least one of the size and location of the text, based on a property of an apparatus for laying out an image using image recognition.

In another exemplary embodiment of the present invention, the controller 110 may control operations of displaying a list in a screen that includes at least one caller Identification (ID) if a contact mode is run, displaying an original image for a caller ID in full screen when the caller ID is selected from among the at least one caller ID of the list, recognizing a subject part of the original image that corresponds to at least a partial area of the original image based on a predetermined criteria, upon reception of a predetermined user command while the original image is displayed in full screen, cropping the recognized subject part, and displaying the subject part in a predetermined area, based on a property of an apparatus for laying out an image using image recognition.

Figure 2:
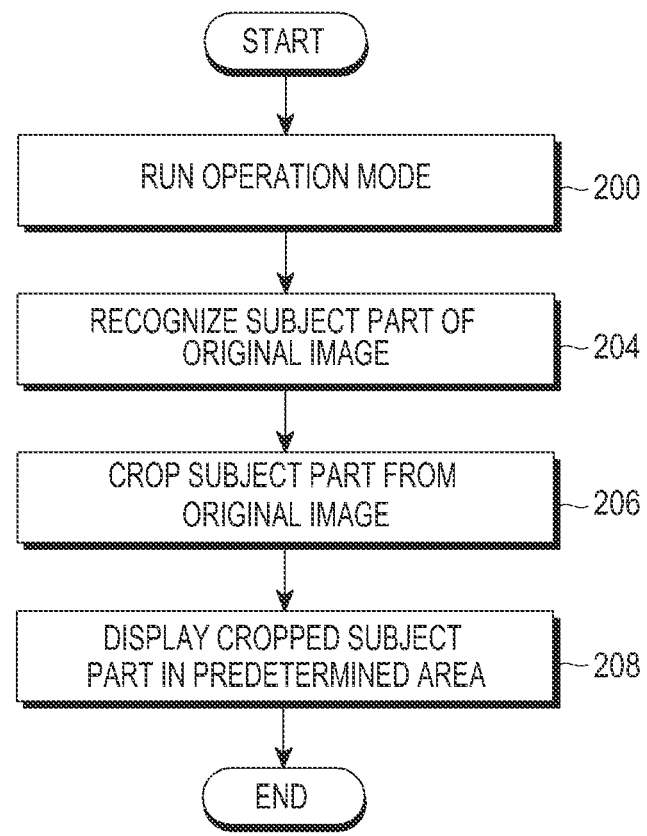
FIG. 2 is a flowchart illustrating operations of laying out an image using image recognition according to an exemplary embodiment of the present invention.

FIG. 2 is a flowchart illustrating operations of laying out an image using image recognition according to an exemplary embodiment of the present invention.

Referring to FIG. 2, an operation mode related to laying out any image(s) using image recognition upon reception of a predetermined user command, such as the user's touch, voice input, button pressure, and the like is run at step 200. The operation mode may be a gallery mode in which a gallery containing at least one image is displayed or a gallery thumbnail mode in which the gallery contains at least one thumbnail image. A subject part corresponding to at least a partial area of an original image is recognized from the original image in the operation mode, at step 204. Operations of recognizing the subject part at step 204 will be described below in more detail. At step 206, the subject part of the original image is cropped, and at step 208, the cropped subject part is displayed in a predetermined area.

In more detail, the subject part of an original image may be determined by recognizing not a background but objects, such as people, animals, or articles in the original image and establishing an area that contains at least one of the objects to be the subject part.

FIGS. 3A to 3F illustrate images in terms of recognition of a subject part of a human image according to an exemplary embodiment of the present invention.

Referring to FIGS. 3A to 3F, for example, if objects are people, operations of recognizing the objects from the original image except the background and setting up the area that contains at least one of the objects to be the subject part may be performed as described below.

Firstly, using a technique of recognizing the face of a person, respective objects p1, p2, and p3 contained in the original image o are recognized. Then, a candidate area c of the subject part is established to include all the recognized objects p1, p2, and p3. The candidate area c may include most of the original image or part of the original image. The size of the candidate area c is compared with a predetermined reference size s, and a subject part m is determined by changing the size of the candidate area c to fit the reference size s.

In establishing the candidate area of an image that has a number of objects, a point in the entire display area is set to have reference coordinates (0, 0), and the candidate area may be established by checking coordinates of recognized objects with respect to the reference coordinates. For example, where the top-left corner of the display area is set up to be the reference coordinate (0, 0) and width of the reference size s is identical to that of the displayed image while the length of the reference size s is smaller than that of the displayed image, the candidate area may be established by determining two objects having the minimum and maximum Y coordinates, respectively, and downwardly and upwardly displacing a predetermined distance from the two objects' coordinates, respectively.

The operation of setting up the subject part from the original image will now be described in more detail.

Figure 3A:
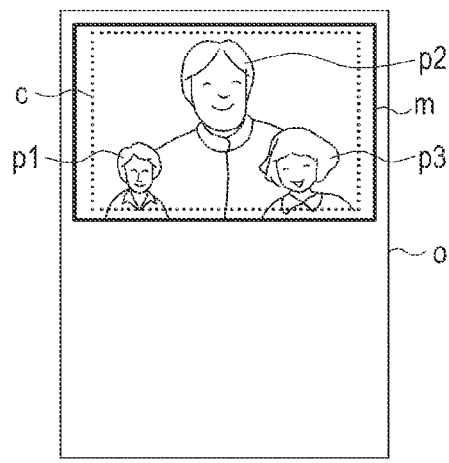
FIGS. 3A to 3F illustrate images in terms of recognition of a subject part of a human image according to an exemplary embodiment of the present invention.
Figure 3B:
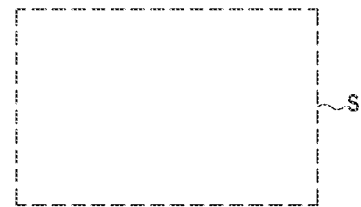

Referring first to FIGS. 3A and 3B, in comparing the size of the candidate area c with the reference size s, if the size of the candidate area c is smaller than the reference size s, and an area containing the candidate area c is established to fit the reference size s and then is determined to be the subject part m.

Figure 3C:
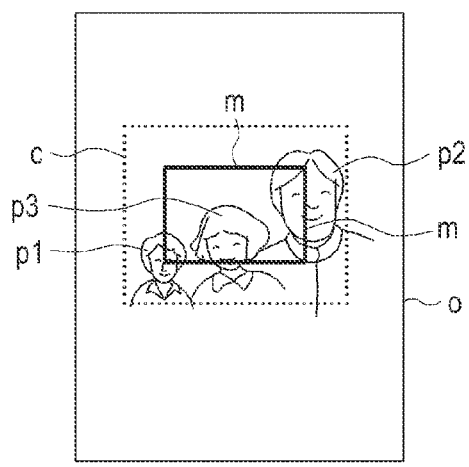
Figure 3D:

Referring to FIGS. 3C and 3D, in comparing the size of the candidate area c with the reference size s, if the size of the candidate area c is bigger than the reference size s, an area containing the center of the candidate area c is determined to fit the reference size s and it is determined whether the area containing the center of the candidate area c includes at least one of the recognized objects. As illustrated in FIG. 3C, if at least one object p3 is included in the area containing the center of the candidate area c, the area is determined to be the subject part m.

Figure 3E:
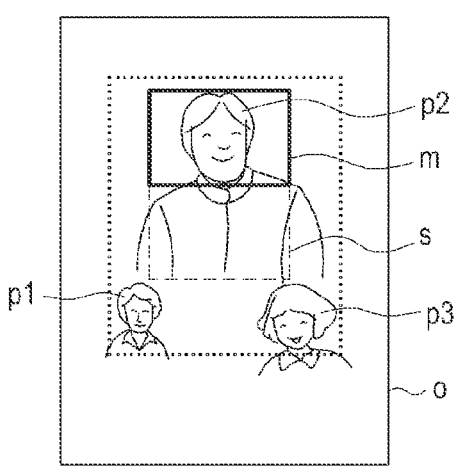
Figure 3F:
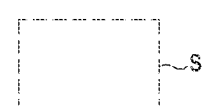

On the other hand, referring to FIGS. 3E and 3F, if the area containing the center of the candidate area c does not include any of the recognized objects, an object having the largest recognized area e.g., the object p2 is detected from among the recognized objects p1, p2, and p2, an area containing the object p2 is set up to fit the reference size s and is determined to be the subject part m.

In recognizing respective objects contained in the original image, if one of the objects is a person, then only the face of the person may be recognized using a technique of recognizing only faces of people. If the objects do not contain any human being but instead contain an animal, then only the face of the animal may be recognized using a technique of recognizing only faces of animals. In an exemplary prioritizing of human beings, animals, and articles in an image, human beings come first, animals come next, and the articles come last. Thus, in terms of displaying the subject part of the image, an area including any human being(s) is set up to be the subject part and is to be displayed. In an exemplary embodiment e.g., where the subject part is to be displayed from an image containing an animal and a desk, an area including the face of the animal is set up to be the subject part and is to be displayed.

Again, to explain the operation of recognizing the subject part at step 204 in more detail, the subject part of the original image may be set up to be in a predetermined reference size from the center of the original image. For example, in an exemplary embodiment where an original image contains a scenic view without any human beings, animals, or articles, the subject part m is set up to fit a predetermined reference size, which is centered at the center of the original image.

Figure 4:
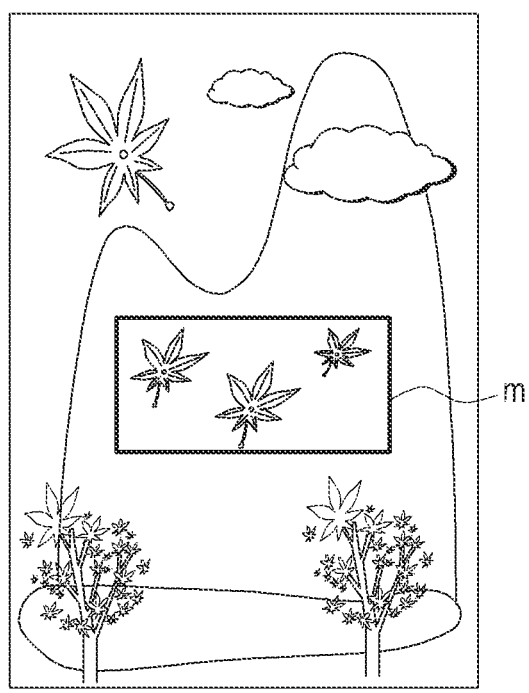
FIG. 4 illustrates images in terms of recognition of a subject part of a background image according to an exemplary embodiment of the present invention.

FIG. 4 illustrates images in terms of recognition of a subject part of a background image according to an exemplary embodiment of the present invention.

Figure 5:
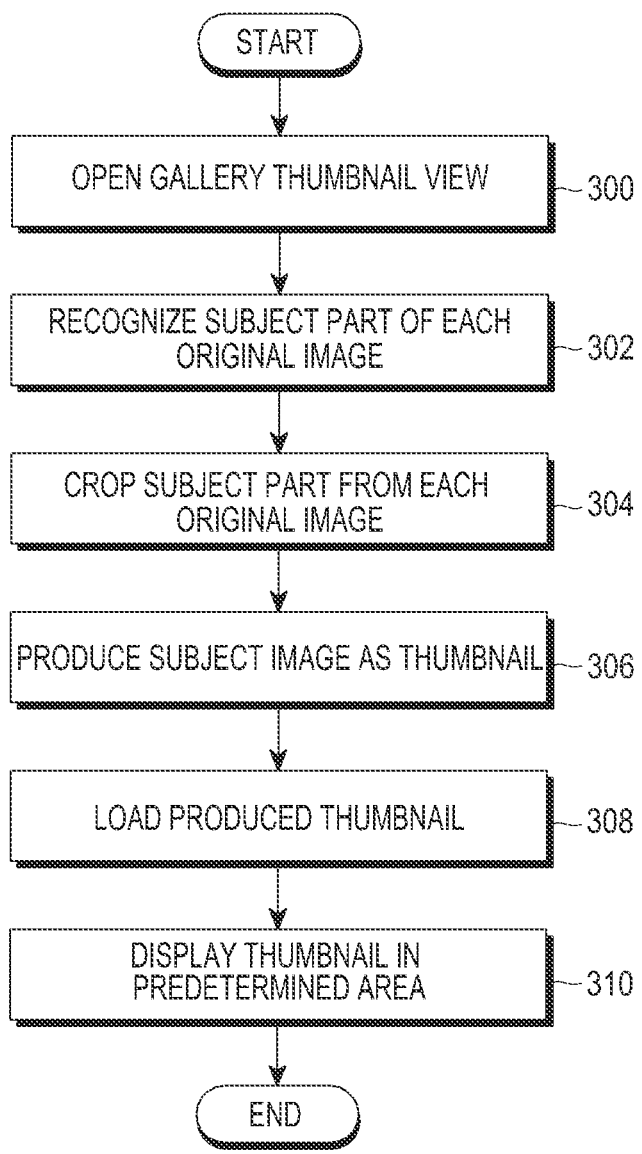
FIG. 5 is a flowchart illustrating operations of laying out an image using image recognition according to an exemplary embodiment of the present invention.

FIG. 5 is a flowchart illustrating operations of laying out an image using image recognition according to an exemplary embodiment of the present invention.

Referring to FIG. 5, a gallery thumbnail view is run in response to a user command, at step 300. At step 302, original images for the thumbnails in the gallery installed in the mobile device 100 are loaded and respective subject parts of the original images are recognized. Operations of recognizing the subject part of the original image are performed in substantially the same way as the foregoing step 204. At step 304, the recognized respective subject parts of the original images are cropped by cropping respective areas including the recognized subject parts of the original images to be fitted to a predetermined thumbnail size. At step 306, the results of cropping of the subject parts are produced as respective thumbnails corresponding to the original images. The produced thumbnails are loaded into the gallery at step 308, and are displayed in predetermined areas at step 310, respectively.

The exemplary embodiment of FIG. 5 describes an operation of cropping each image not to have the corresponding subject part cut out, when the user opens the gallery and sets a thumbnail view of a photo list in which the photo list is displayed in the thumbnail format. This ensures that each thumbnail discloses the subject part of the corresponding original image.

FIGS. 6A to 6D illustrate a thumbnail view screen resulting from operations of laying out images using image recognition according to an exemplary embodiment of the present invention.

Figures 6A, 6B, 6C, 6D:
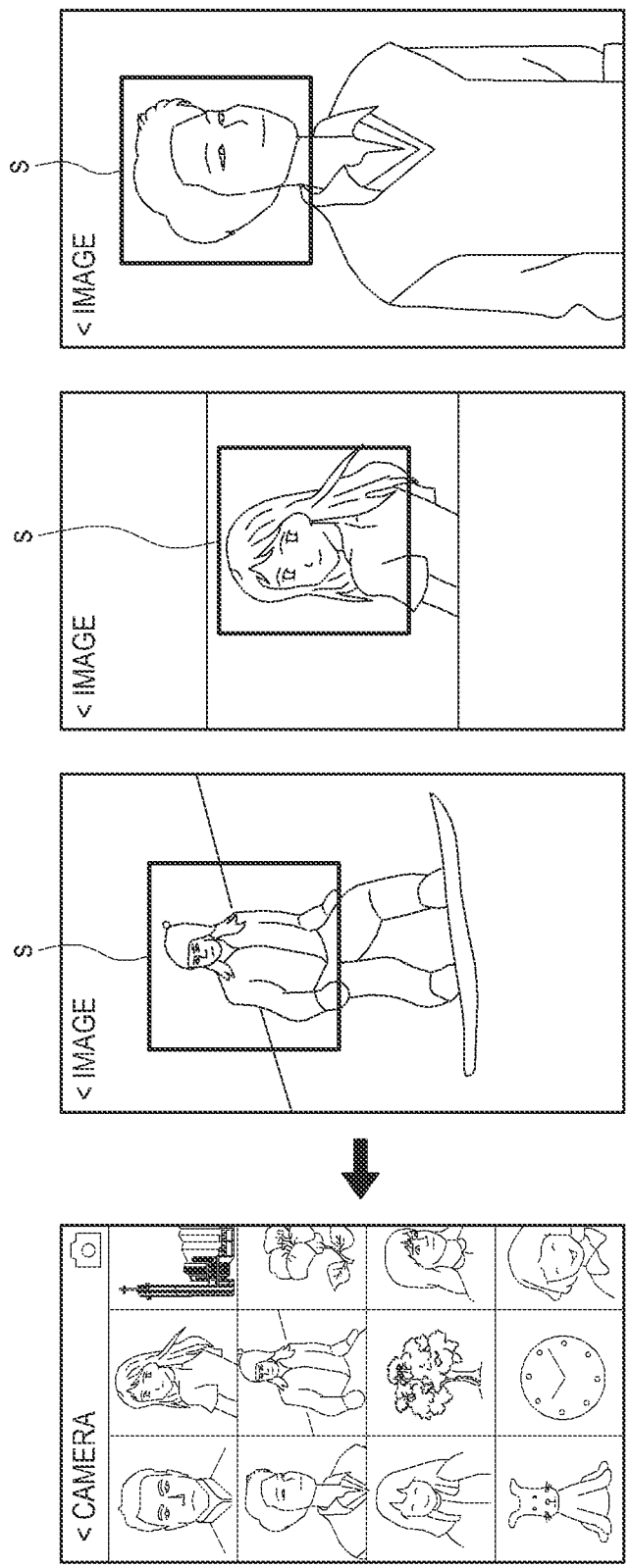
FIGS. 6A to 6D illustrate a thumbnail view screen resulting from operations of laying out images using image recognition according to an exemplary embodiment of the present invention.

Referring to FIGS. 6A to 6D, photos in the gallery of the mobile device 100 are illustrated, each of which has a mark of an area s that contains the subject part to be later cropped and produced as a thumbnail. In FIG. 6A is a resulting thumbnail view of performing operations of FIG. 5, including an operation of generating respective thumbnails of subject parts of the corresponding photo images and laying out them. FIGS. 6B-6D illustrate the cropping of images, selected from among the thumbnails, so as not to have the corresponding subject part cut out.

Figure 7:
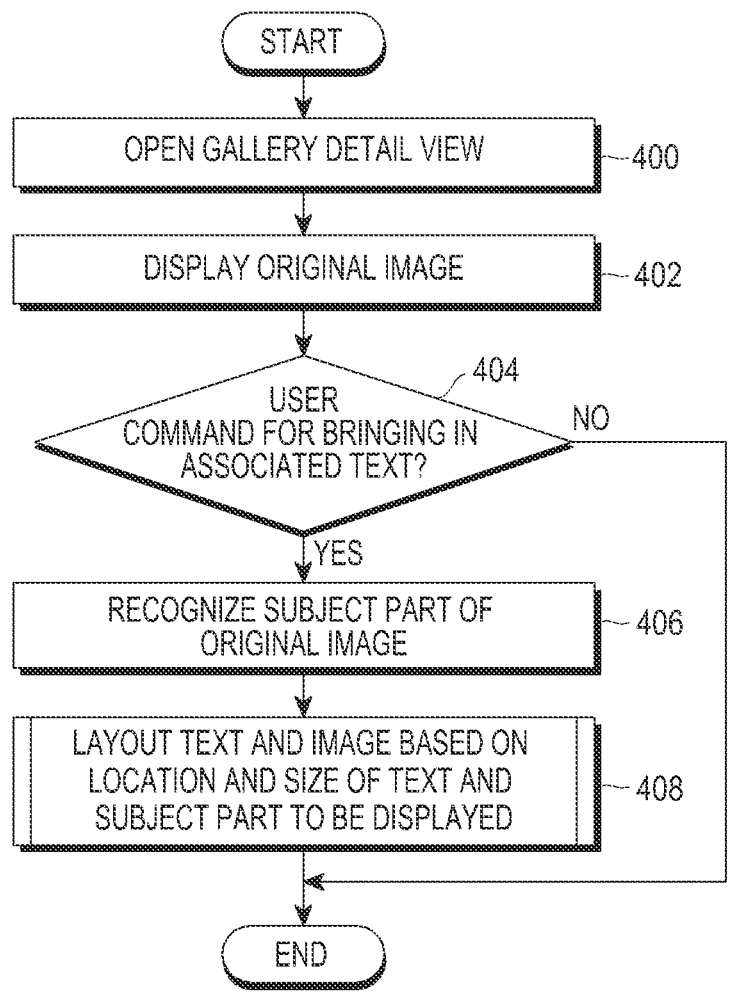
FIG. 7 is a flowchart illustrating operations of laying out an image using image recognition according to an exemplary embodiment of the present invention.

FIG. 7 is a flowchart illustrating operations of laying out an image using image recognition according to an exemplary embodiment of the present invention.

Referring to FIG. 7, a gallery detail view is run in response to a user command at step 400. Running the gallery detail view includes displaying an image in full screen or in a predetermined size when the image is selected from among a number of images in the gallery of the mobile device 100. At step 402, an original image selected by the user is displayed. It is determined if there is a predetermined user command for bringing in text associated with the original image, at step 404. The user command may be a touch input like a flick, a voice command, button pressure, or the like. If there is the predetermined user command for bringing in text associated with the original image at step 404, the process goes to step 406, or otherwise if there is no user command, the process ends. At step 406, a subject part of the original image is recognized. Operations of recognizing the subject part of the original image at step 406 are performed in substantially the same way as the foregoing step 204. At step 408, the original image and the text to be displayed with the original image are laid out by determining where to display the subject part of the original image and the text in the screen such that the subject part is not obscured by the text, taking into account the size and location of the text.

Such layout operations at step 408 will be described below in more detail.

Figure 8:
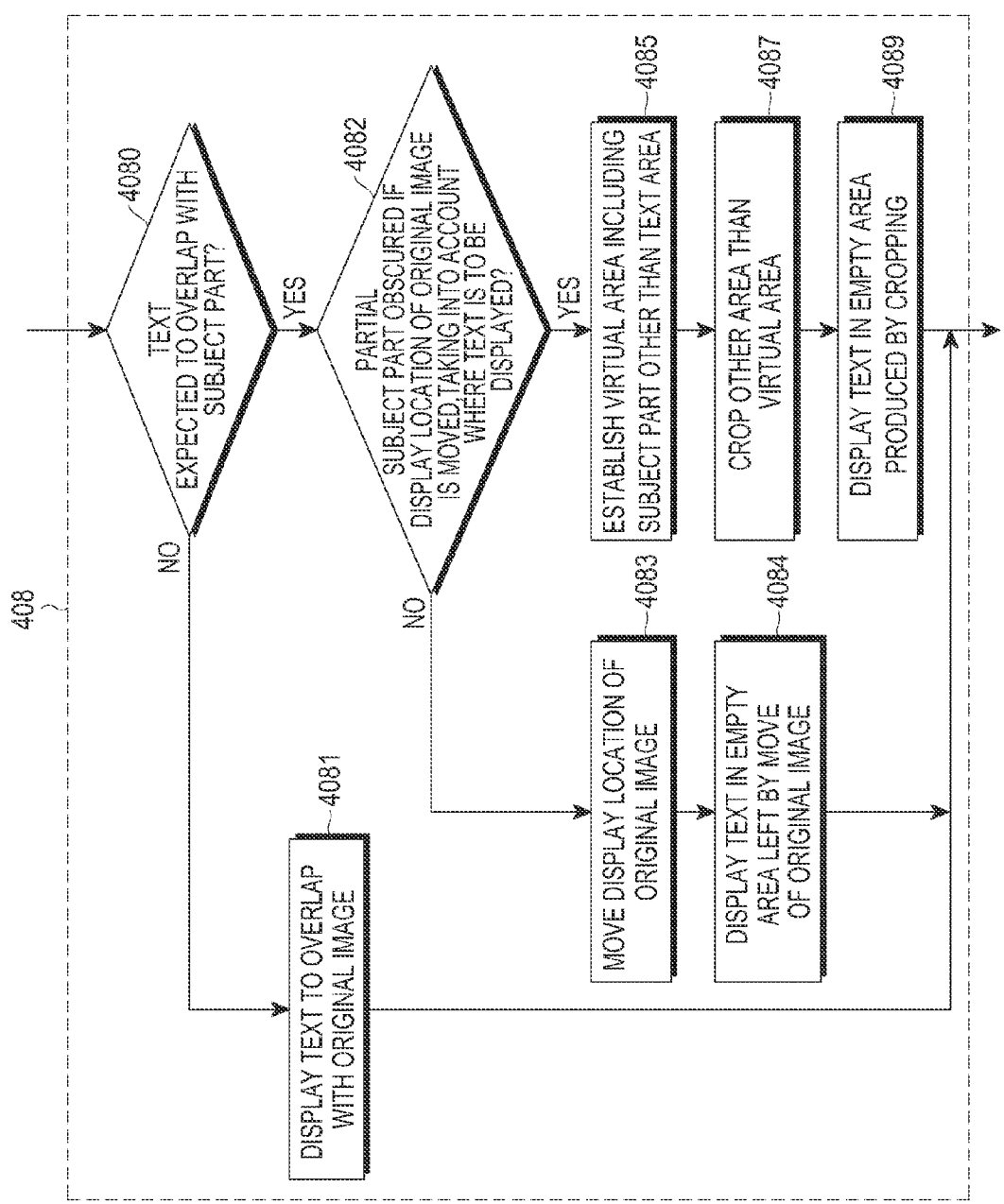
FIG. 8 is a flowchart illustrating operations of laying out an image and text according to an exemplary embodiment of the present invention.

FIG. 8 is a flowchart illustrating operations of laying out an image and text according to an exemplary embodiment of the present invention.

Referring to FIG. 8, it is determined whether the text is expected to overlap with the subject part of the original image based on the size and location of the text to be displayed, at step 4080. The location of the text to be displayed may be on any of upper, lower, left and right sides of the display area.

If it is determined that the text to be displayed is not expected to overlap with the subject part of the original image at step 4080, the process goes to step 4081, or, if the text to be displayed is expected to overlap with the subject part of the original image, the process goes to step 4082.

At step 4081, the text to be displayed is displayed in a predetermined area to overlap with the original image. Here, the text may be displayed in a translucent state or in an opaque state.

For a more detailed view of an image, in performing an operation of bringing in and displaying text associated with the image in a predetermined area, if the subject part of the image is not obscured by the display of the text but disclosed, the text may be allowed to be displayed over the display of the image.

FIGS. 9A to 9C1 illustrate screens having images and associated text resulting from operations of laying out images using image recognition according to an exemplary embodiment of the present invention.

Referring to FIGS. 9A to 9C1, FIG. 9A is a detailed view of an image from the gallery, in which an area s containing the subject part of the image is marked. FIG. 9A1 illustrates a result of laying out the image with associated text using image recognition without image cropping or moving, with the text t overlapping with the image.

If the text to be displayed is expected to overlap with the original image at step 4080, it is determined at step 4082 whether the subject part of the original image is expected to be obscured if the display location of the original image is moved as far as the size of the text to be displayed away from where the text is to be displayed. If it is determined at step 4082 that a part of the subject part is expected not to be obscured if the display location of the original image is moved, the process goes to step 4083, or otherwise, if part of the subject image is expected to be obscured if the location of the original image is moved, the process goes to step 4085.

At step 4083, the display location of the original image is moved. More specifically, the display location of the displayed original image is moved away from where the text is to be displayed. For example, if it is assumed that the text is located on the lower side of the entire display screen, the entire display location of the original image is moved upward to leave an area for the text. At step 4084, the text is displayed in the area left for the text.

For a more detailed view of an image, in performing an operation of bringing in and displaying text associated with the image in a predetermined area, if the subject part of the image is not obscured but disclosed if the image is moved, the image is moved as far as the size of the text to leave room to display the text. Referring to FIG. 9B, a detail view of an image from the gallery is illustrated, in which an area s containing the subject part of the image is marked. FIG. 9B1 illustrates a result of laying out the image with associated text using image recognition by moving the display location of the image to make sure that the subject part of the image is displayed as a whole while displaying the text t in an empty space of the display screen which is produced by the move of the display location of the image.

If it is determined at step 4082 that the entire or partial subject part of the image is expected to be obscured if the location of the image is moved, a virtual area is established to include the subject part and not include an area for the text to be displayed at step 4085. More specifically, in an exemplary embodiment where the text is located on the upper or lower side of the entire display, the virtual area may be established to include the subject part of the image and left and right spaces of the subject part except where the text is located. In another exemplary embodiment where the text is located on the left or right side of the entire display, the virtual area may be established to include the subject part of the image and upper and lower spaces of the subject part except where the text is located. At step 4087, areas other than the virtual area are cropped out and an image in the virtual area is moved away from where the text is to be displayed to avoid overlapping of the image and the text. At step 4089, the text is displayed in an empty area produced by the cropping.

For a more detailed view of an image, in performing an operation of bringing in and displaying text associated with the image in a predetermined area, an area that does not include the subject part of the image may be established and cropped out and the text may be displayed where the area is cropped out. In an exemplary embodiment where the text is located on the lower side of the entire display screen, the area to be cropped is an area excluding the subject part, left and right sides of the subject part, i.e., only upper and lower sides of the entire image that do not contain the subject part are cropped. Then, to avoid the image and the text from overlapping with each other, the image display in an area not to be cropped is moved away from where the text is to be displayed and the text is displayed in an empty space produced by the move of the image display. In another exemplary embodiment where the text is located on the left or right side of the entire display screen, the area to be cropped is an area excluding the subject part, upper and lower sides of the subject part, i.e., only left and right sides of the entire image that do not contain the subject part are cropped. Then, the image display in the area not to be cropped is moved away from where the text is to be displayed and the text is displayed in an empty space produced by the move of the image display. FIG. 9C is a detail view of an image from the gallery, in which an area s containing the subject part of the image is marked. FIG. 9C1 illustrates a result of laying out the image with associated text using image recognition by cropping out an area other than the virtual area that includes the subject part of the image to show the subject part in the display screen and moving the display location of the virtual area such that the text t is displayed in an empty display area produced by the move of the display location of the image.

Figure 10:
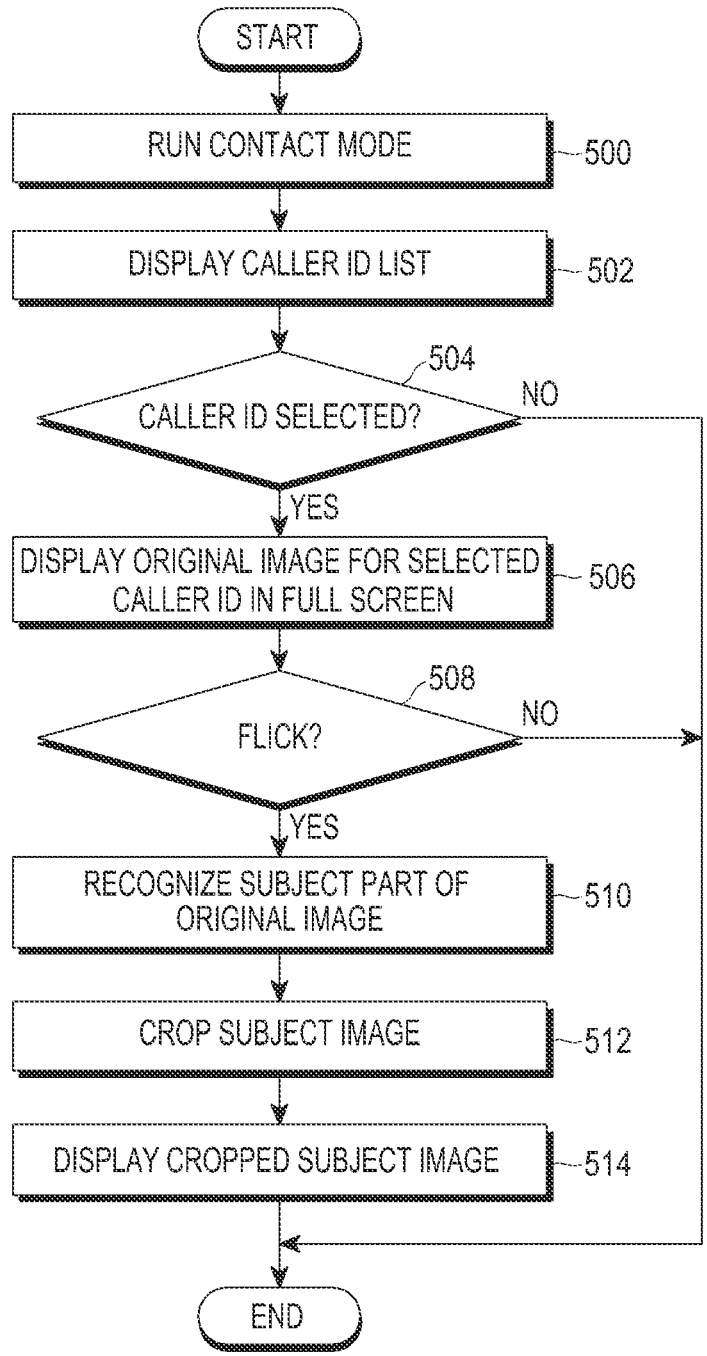
FIG. 10 is a flowchart illustrating operations of laying out an image using image recognition according to another exemplary embodiment of the present invention.

FIG. 10 is a flowchart illustrating operations of laying out an image using image recognition according to an exemplary embodiment of the present invention.

Referring to FIG. 10, a contact mode is run in response to a user command, at step 500. At step 502, a caller ID list is displayed in the contact mode. At step 504, it is determined if a caller ID has been selected from the caller ID list by a touch or a voice command of the user. If a caller ID has been selected, the process goes to step 506, or otherwise if any caller ID has not been selected, the process ends. At step 506, a predetermined original image for the selected caller ID is displayed in full screen. At this time, predetermined items such as, name, phone number, email address, etc. of the caller ID are represented by respective icons and the icons are displayed to overlap with the original image displayed in full screen, and additional icons to stop the contact mode, return to the home screen, perform editing, etc., may also be displayed to overlap with the original image displayed in full screen.

It is determined if there is a predetermined user command for displaying detailed information of the caller ID at step 508. The user command may be the user's touch input like a flick, a voice command, icon selection or button pressure. If there is the user command at step 508, the process goes to step 510, or otherwise the process ends.

At step 510, a subject part of the original image is recognized. Operations of recognizing the subject part of the original image at step 510 are performed in substantially the same way as the foregoing step 204. At step 512 the subject part of the original image is cropped, and at step 514 the cropped subject part is displayed in a predetermined area. At step 514, the predetermined items of the caller ID, e.g., the caller ID's name, phone number, email address, etc. may be displayed in a predetermined area.

Alternatively, after recognition of the subject part of the original image at step 510, only the subject part may be displayed in a predetermined area. In the case in which only the subject part of the original image is displayed in the predetermined area, if a touch including drag or flick is made on the displayed original image, what is disclosed from the displayed original image may be changed while the original image is dragged or flicked.

The exemplary embodiment of FIG. 10 describes operations of displaying a predetermined image for a selected caller ID in full screen when the caller ID is selected from among at least one caller ID displayed in the contact mode. The exemplary embodiment also describes operations of enabling a subject part of the image to be displayed when detailed information of the caller ID is to be displayed by the user command.

Figure 11A:
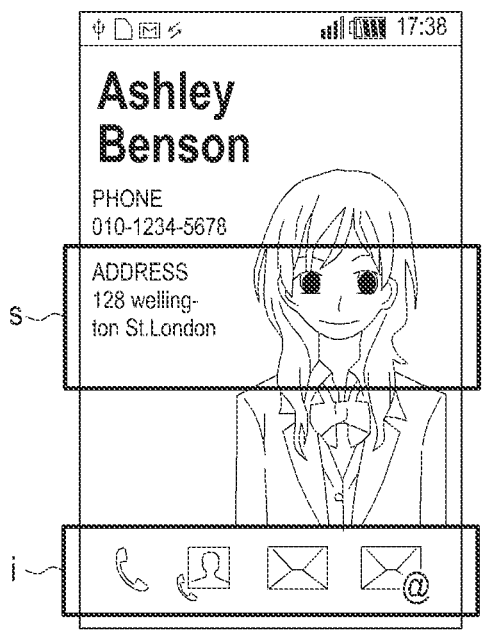
FIGS. 11A and 11B illustrate running screens of a contact mode, resulting from operations of laying out images using image recognition according to an exemplary embodiment of the present invention.
Figure 11B:

FIGS. 11A and 11B illustrate running screens of a contact mode, resulting from operations of laying out images using image recognition according to an exemplary embodiment of the present invention.

Referring to FIGS. 11A and 11B, FIG. 11A illustrates a predetermined original image for a caller ID in full screen having an image i of respective icons that represent predetermined items for the caller ID. The original image of FIG. 11A has an area s that contains the subject part of the original image. FIG. 11B illustrates an image resulting from the process of FIG. 10A, the image representing detailed information of the caller ID with the subject part of the image and predetermined items including the caller ID's phone number, email address, etc.

Exemplary embodiments of the present invention are not limited to that described above. Rather, various changes and alternations may be made within the spirit and scope of the present invention defined in the accompanying claims.

For example, the exemplary embodiments described above included operations of recognizing objects other than the background of the original image and establishing an area that includes at least one of the objects to be the subject part of the original image, the objects being people, but the invention may also be applied where the objects are animals or articles.

Additionally, if the size of the text to be displayed with the original image is fixed but the display location of the text is not fixed, after the subject part of the original image is recognized at step 406, the text and the original image may be laid out by determining where to display the text in the screen such that the subject part of the original image is not obscured by performing at least one of operations of cropping an image area containing the subject part and moving the image area, taking into account the size of the text to be displayed with the original image in the screen. In this case, if the entire or partial subject part is obscured even when the at least one of the cropping and moving operations of the subject part of the original image is performed, the overlapping operation as described above may be applied.

Furthermore, if the size of the text to be displayed with the original image is not fixed but the display location of the text is fixed, after the subject part of the original image is recognized at step 406, the text and the original image may be laid out by determining the size of the text to be displayed in the screen such that the subject part of the original image is not obscured by the text by performing at least one of the foregoing overlapping, moving and cropping operations, taking into account the location of the text to be displayed with the original image in the screen.

Additionally, in performing the operation of bringing in and displaying text in a predetermined area, it may also be possible to enable the text to overlap with the original image and simultaneously move the display location of the original image.

For a detailed view of an image, in performing the operation of bringing in and displaying text associated with the image in a predetermined area, it may also be possible to crop and move the image and additionally, overlap the text with the image.

In addition to the moving, cropping, and overlapping operations on an image, it may also be possible to lay out the subject part of the image by reducing an image size of the subject part.

It will be appreciated that exemplary embodiments of the present invention may be implemented in the form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The memory included in the power transmitter or the power receiver may be an example of the computer readable recording medium suitable for storing a program or programs having instructions that implement the exemplary embodiments of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of laying out an image using image recognition, the method comprising:
    recognizing, from an original image, a subject part of the original image based on predetermined criteria in response to a predetermined user command while the original image is displayed; and
    determining where to display at least one of the subject part of the original image and text such that the subject part is not obscured by the text, taking into account at least one of a size and a location of the text to be displayed with the original image,
    wherein the determining of where to display at least one of the subject part of the original image and text comprises:
        determining whether the text to be displayed is expected to overlap with the subject part of the original image based on the size and the location of the text to be displayed,
        determining whether the entire or partial subject part of the original image is expected to be obscured if the display location of the original image is moved as far as the size of the text to be displayed away from the location of the text to be displayed, if the text to be displayed is expected to overlap with the subject part of the original image,
        establishing a virtual area that contains the subject part of the original image and does not contain a location in which to display the text, cropping another area than the virtual area, and moving a display of the original image in the virtual image away from the location in which to display the text, and
        displaying the text in an empty area produced by cropping the other area than the virtual area.

2. The method of claim 1, further comprising determining the size of at least one of the subject part of the original image and the text to be displayed such that the subject part is not obscured by the text, taking into account at least one of the size and the location of the text to be displayed with the original image.

3. The method of claim 1, further comprising, if it is determined that the entire or partial subject part of the original image is not expected to be obscured:
    moving a display location where the original image is displayed away from the location in which to display the text; and
    displaying the text in an empty space produced by moving the display location where the original image is displayed.

4. The method of claim 1, further comprising, if it is determined that the text to be displayed is not expected to overlap with the subject part of the original image, displaying the text to be displayed in a predetermined area so that the text overlaps with the original image.

5. A method of laying out an image using image recognition, the method comprising:
    displaying a list of at least one caller identification (ID) on a display;
    displaying an original image for a caller ID on a full screen of the display if the caller ID is selected from among the at least one caller ID in the list;
    recognizing, from the original image, a subject part that corresponds to at least a partial area of the original image displayed on the full screen based on a predetermined criterion if a predetermined user command is input;
    cropping the recognized subject part; and
    displaying the cropped image in a predetermined area on the display.

6. The method of claim 5, wherein the displaying of the original image for the caller ID on the full screen comprises:
    producing items for the caller ID as respective icons; and
    displaying the icons in the predetermined area.

7. The method of claim 5, wherein the displaying of the cropped image in the predetermined area in the screen comprises displaying items for the caller ID in a predetermined area in the screen.

8. The method of claim 6, wherein the items include at least one of the caller ID's name, phone number, and e-mail address.

9. The method of claim 5, further comprising, after the recognizing of the subject part of the original image, displaying the original image only to disclose the recognized subject part in the predetermined area.

10. The method of claim 9, further comprising, if a touch including drag or flick is made on the original image displayed only to disclose the recognized subject part in a predetermined area, changing what is disclosed in the original image while the displayed original image is dragged or flicked.

11. The method of claim 5, wherein the recognizing of the subject part comprises:
    recognizing objects contained in the original image except a background of the original image; and
    setting up at least one of the objects as the subject part.

12. The method of claim 11, wherein the recognizing of objects contained in the original image except a background of the original image and setting up at least one of the objects as the subject part comprises:

recognizing respective objects contained in the original image;

establishing a candidate area for the subject part including all of the recognized objects;

determining the subject part by comparing a size of the candidate area with a predetermined reference size; and changing the size of the candidate area to fit the reference size.

13. The method of claim 12, wherein the determining of the subject part by comparing a size of the candidate area with a predetermined reference size and the changing of the size of the candidate area to fit the reference size comprises determining the subject part by establishing an area including the candidate area to fit the reference size, if the size of the candidate area is less than the reference size.

14. The method of claim 12, wherein the determining of the subject part by comparing a size of the candidate area with a predetermined reference size and the changing of the size of the candidate area to fit the reference size comprises:

establishing an area that includes a center of the candidate area to fit the reference size, if the size of the candidate area is greater than the reference size;

detecting an object having a largest recognized area from among the recognized objects, if any of the objects is contained in the area that includes the center of the candidate area;

establishing an area that includes the detected object having the largest recognized area to fit the reference size; and determining the area to be the subject part.

15. The method of claim 14, further comprising, if any of the objects is contained in the area that includes the center of the candidate area, determining the area that includes the center of the candidate area to be the subject part.

16. The method of claim 12, wherein the recognizing of respective objects contained in the original image comprises:

recognizing only a face of a person if one of the objects contained in the original image is the person; and recognizing only a face of an animal if the objects contained in the original image do not contain any human being but an animal.

17. The method of claim 5, wherein the recognizing of the subject part comprises establishing the subject part to be an area in a predetermined reference size centered at a center of the original image.

18. A non-transitory computer-readable storage medium storing instructions that, when executed, cause at least one processor to perform the method of claim 1.

19. An apparatus for laying out an image using image recognition, the apparatus comprising:

a display configured to output a screen of an application program and a menu state; and a controller configured to:

recognize, from the original image, a subject part of the original image based on a predetermined criteria in response to a predetermined user command while the original image is displayed on the display, determine a display location where to display at least one of the subject part of the original image and text such that the subject part is not obscured by the text, taking into account at least one of a size of the text and a location of the text to be displayed with the original image, determine whether the text is expected to overlap with the subject part of the original image based on the size and the location of the text, determine whether an entire or a partial subject part of the original image is expected to be obscured if the display location is moved as far as the size of the text to be displayed away from the location of the text to be displayed, if the text is expected to overlap with the subject part of the original image, establish a virtual area that comprises the subject part of the original image and omits the location of the text, crop another area than the virtual area, and move the display location in the virtual image away from the location of the text, and display the text in an empty area produced by the cropping of the other area.

20. An apparatus for laying out an image using image recognition, the apparatus comprising:

a display configured to output a screen of an application program and a menu state; and a controller configured to:

output a list of at least one caller identification (ID) through the display, output an original image for a caller ID on a full screen of the display if the caller ID is selected from among the at least one caller ID in the list, recognize, from the original image, a subject part that corresponds to at least a partial area of the original image that is displayed on the full screen based on a predetermined criterion if a predetermined user command is input, crop the recognized subject part, and output the cropped image in a predetermined area through the display.

\* \* \* \* \*